US011905159B1

(12) United States Patent
Hill

(10) Patent No.: US 11,905,159 B1
(45) **Date of Patent: *Feb. 20, 2024**

(54) VAPOR RECOVERY SYSTEM FOR MOBILE FUELERS

(71) Applicant: Bob J. Hill, Visalia, CA (US)

(72) Inventor: Bob J. Hill, Visalia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,105

(22) Filed: Dec. 9, 2022

Related U.S. Application Data

(63) Continuation of application No. 17/874,259, filed on Jul. 26, 2022, now Pat. No. 11,524,888.

(51) Int. Cl.
*B67D 7/04* (2010.01)

(52) U.S. Cl.
CPC ........... *B67D 7/048* (2013.01); *B67D 7/0492* (2013.01)

(58) Field of Classification Search
CPC ........ B67D 7/04; B67D 7/048; B67D 7/0482; B67D 7/0484; B67D 2007/0494
See application file for complete search history.

(56) References Cited

U.S. PATENT DOCUMENTS

| | | | | |
|---|---|---|---|---|
| 2,331,879 A | | 10/1943 | White | |
| 3,687,087 A | | 8/1972 | Yurkoski et al. | |
| 3,814,148 A | | 6/1974 | Wostl | |
| 3,941,168 A | | 3/1976 | Hiller et al. | |
| 3,981,334 A | | 9/1976 | Deters | |
| 3,981,335 A | | 9/1976 | Deters | |
| 4,068,687 A | | 1/1978 | Long | |
| 4,095,626 A | * | 6/1978 | Healy | B67D 7/0484 141/46 |
| 4,336,830 A | * | 6/1982 | Healy | B67D 7/0484 141/206 |
| 5,035,729 A | | 7/1991 | Hodgkins | |
| 5,103,877 A | | 4/1992 | Sherwood et al. | |
| 5,174,346 A | | 12/1992 | Healy | |
| 5,178,197 A | | 1/1993 | Healy | |
| 5,207,249 A | * | 5/1993 | Healy | B67D 7/0484 141/46 |
| 5,297,574 A | | 3/1994 | Healy | |
| 5,305,807 A | | 4/1994 | Healy | |

(Continued)

OTHER PUBLICATIONS

State of California Executive Order G-70-193 "Certification of the Hill-Vac Vapor Recovery System for Cargo Tank Motor Vehicle Fueling Systems" Dec. 9, 1999.

*Primary Examiner* — Timothy L Maust
(74) *Attorney, Agent, or Firm* — Sierra IP Law, PC; William K. Nelson

(57) ABSTRACT

A system for recovering fuel vapor during delivery of fuel by a mobile fueler includes a storage tank covered with a layer of insulation, a supply pump connected to the storage tank for delivering fuel therefrom, and a fuel dispensing assembly, preferably a coaxial hose and nozzle, including a supply outlet for delivering fuel to a vehicle being fueled, and a vapor recovery inlet proximate the supply outlet. A diverter valve diverts a portion of the fuel in the supply line, and a vacuum jet pump is connected to the storage tank and, by a vapor line, to the vapor recovery inlet, which is driven by the diverted fuel to create a vacuum in the vapor line to draw vapor into the vapor recovery inlet, through the vapor line, and into the storage tank.

19 Claims, 8 Drawing Sheets

(56) References Cited

U.S. PATENT DOCUMENTS

| | | | | | |
|---|---|---|---|---|---|
| 5,327,944 | A * | 7/1994 | Healy | B67D 7/54 141/46 |
| 5,386,859 | A | 2/1995 | Healy | |
| 5,494,409 | A | 2/1996 | Webb et al. | |
| 5,513,680 | A * | 5/1996 | Hilliard, Jr. | B01D 19/0005 141/82 |
| 5,584,279 | A | 12/1996 | Brunnhofer | |
| 5,676,181 | A | 10/1997 | Healy | |
| 5,765,603 | A | 6/1998 | Healy | |
| 5,983,962 | A | 11/1999 | Gerardot | |
| 6,176,275 | B1 * | 1/2001 | Hill | B67D 7/0482 141/285 |
| 6,302,164 | B1 * | 10/2001 | Nitecki | B67D 7/0488 141/59 |
| 6,923,221 | B2 | 8/2005 | Riffle | |
| 6,941,978 | B2 | 9/2005 | Riffle | |
| 8,353,319 | B2 | 1/2013 | Bonner | |
| 8,925,595 | B2 | 1/2015 | Bonner et al. | |
| 8,936,051 | B2 | 1/2015 | Bonner et al. | |
| 10,850,971 | B1 * | 12/2020 | Al Ghurair | B67D 7/54 |
| 11,072,084 | B2 | 7/2021 | Willis | |
| 11,524,888 | B1 * | 12/2022 | Hill | B67D 7/0492 |
| 2015/0013826 | A1 * | 1/2015 | Driftmeyer | B67D 7/46 141/1 |

* cited by examiner

SECTION B-B

SECTION A-A

SECTION B-B

VAPOR RECOVERY SYSTEM FOR MOBILE FUELERS

FIELD OF THE INVENTION

The present invention relates generally to systems for delivering volatile liquids, such as gasoline or other fuels, to vehicles, and more particularly to vapor recovery systems for fuel trucks or other mobile fuelers that recover vapors from fuel dispensers during fuel delivery.

DISCUSSION OF THE BACKGROUND

Volatile liquids, such as gasoline or other fuels, are generally delivered to the fuel tank of an automobile or other vehicle using a fuel dispensing nozzle. During delivery, gasoline vapors may evaporate from liquid gasoline due to heat and/or agitation of the gasoline. If these vapors are not recovered, they may escape from the nozzle, contributing to air pollution and/or wasting fuel resources. Thus, recovery of vapors resulting from the delivery of gasoline may be desirable and, in addition, may be mandated by regulatory agencies. For example, in the 1970's, the State of California enacted legislation requiring recovery of at least 94.5 percent of all vapors resulting from fuel delivery.

To recover gasoline vapors during delivery, fuel dispensing nozzles having a coaxial construction are often used. The nozzle generally has an inner spout connected to a supply line which provides a supply outlet for the gasoline being supplied to the fuel tank being filled. A vapor conduit, such as a boot assembly, surrounds the inner spout which has a vapor inlet proximate the supply outlet. The nozzle is connected to a coaxial hose, which is connected to a valve which separates the supply line from the vapor line.

Generally, the nozzles and hoses are connected to stationary pumps, such as at service stations, which are connected to storage tanks, often located underground, that store large volumes of fuel. Vapor recovery systems for such stationary fuels sources have been proposed and implemented which recover a substantial amount of the vapors from fuel dispensing nozzles. However, conventional vapor recovery systems have been unable to efficiently recover gasoline vapors during delivery in mobile fuelers, such as fleet fueling trucks. Vapor pressures encountered in the storage tanks of mobile delivery systems may be substantially higher than those found in underground stationary tanks, for example, due to increased heat experienced by mobile fuel truck storage tanks and/or increased agitation of the gasoline resulting from movement of the fuel truck. Despite regulations in California and elsewhere since the 1970's, an efficient vapor recovery system for mobile fuelers has not been successfully developed.

Therefore, improved, efficient, and reliable more efficient vapor recovery systems for mobile fuelers are needed, particularly with rising fuel scarcity.

SUMMARY OF THE INVENTION

The present invention provides a fuel delivery and vapor recovery system for a mobile fueler, and to methods of recovering fuel vapor from mobile fueling systems. In accordance with one aspect of the present invention, a system is provided that includes a mobile storage tank having a liquid region and a vapor region therein. The storage tank is at least partially covered with a layer of insulation, such as polyurethane foam, providing a predetermined thermal insulating value, preferably a material with a thermal resistance R value of at least about 14.

A supply pump is connected to the storage tank for delivering fuel from the liquid region, and a fuel dispensing assembly is connected in line with the supply pump. The fuel dispensing assembly preferably includes a supply outlet for delivering fuel from the storage tank to a vehicle being fueled, and a vapor recovery inlet proximate the supply outlet. A diverter valve is provided for diverting a portion of the fuel in the supply line, and one or more vacuum jet pumps are connected by a vapor line to the vapor recovery inlet and also to the diverter valve. The vacuum jet pump is driven by the fuel diverted from the supply line to create a predetermined vacuum pressure in the vapor line, the vacuum jet pump being connected to the storage tank to direct vapor from the vapor recovery inlet through the vapor line into the vapor region of the storage tank.

In a preferred form, the system also includes a vapor pot in the vapor line for separating liquid fuel from vapor in the vapor line, the vapor pot being preferably mounted at a low point of the system. The vapor pot may be connected to the supply line for returning separated liquid fuel back to the supply line, for example, by a siphon check valve connected between the vapor pot and the supply line.

In another aspect of the present invention, a kit is provided for retrofitting a mobile fueler having an existing storage tank and supply line, preferably including a supply pump, for delivering fuel from the storage tank to a vehicle being fueled. The kit may include a diverter valve, a fuel dispensing assembly including a supply outlet for delivering fuel to the vehicle being fueled, and a vapor recovery inlet proximate the supply outlet, a vapor pot and a vacuum jet pump.

The diverter valve may be connectable in the supply line for diverting a portion of the fuel being delivered from the storage tank, and the fuel dispensing assembly may be connectable to the supply line. The vapor pot may be connectable by a vapor line to the vapor recovery inlet for separating liquid fuel from vapor in the vapor line. The vacuum jet pump has a vapor inlet connectable to the vapor line, a vapor outlet connectable to the storage tank, and a fuel inlet connectable by a fuel diversion line to the diverter valve. The vacuum jet pump has a fuel path through which fuel diverted from the supply pump may be directed to create a predetermined vacuum pressure in the vapor inlet and consequently in the vapor line.

In a preferred form, the fuel dispensing assembly includes a coaxial hose and nozzle, a vapor adapter splitter valve, and may include a hose reel for storing the coaxial hose or other hose retractor assembly. The kit also preferably includes foam insulation for covering at least a portion of the storage tank, the foam insulation having a thermal insulating R value preferably of at least about 14.

In some embodiments, the vacuum jet pump is configured to generate a vacuum between about −20 inches and about −80 inches of water column at the vapor inlet when driven by a fuel pressure between about 20 psi and about 40 psi. In some embodiments, the vacuum jet pump generates a vacuum pressure in the vapor line between about −20 inches and about −40 inches water column when fuel is being delivered through the fuel dispensing assembly, and between about −40 inches and about −72 inches of water column when fuel is not being delivered. Thus, the kit, when incorporated into a fuel delivery system, may provide a vapor recovery system capable of recovering at least about 95% of the fuel vapor emitted by the fuel dispensing assembly.

In accordance with still another aspect of the present invention, a method is provided for recovering fuel vapor during delivery of fuel from a mobile fuel delivery system to a vehicle. The method may include the steps of providing a mobile storage tank and a supply line communicating with the storage tank, and providing a fuel dispensing assembly connected to the supply line, the fuel dispensing assembly comprising a supply outlet and a vapor recovery inlet proximate the supply outlet. Fuel may be directed from the storage tank through the supply line to the supply outlet, and a portion of the fuel in the supply line may be diverted to generate a predetermined vacuum pressure at the vapor recovery inlet to substantially recover fuel vapor emitted from the supply outlet. The recovered fuel vapor may then be directed into the storage tank.

The vacuum may be generated by directing the diverted fuel through a vacuum jet pump to create the predetermined vacuum pressure in a vapor line communicating with the vapor recovery inlet. Vapor from the storage tank may be controllably introduced into the vapor line to maintain the predetermined vacuum pressure, for example, to maintain the predetermined vacuum pressure within a range between about −20 inches and about −80 inches of water column (w.g.).

An important feature of the systems and methods of the present invention is that the pressures of the system, e.g., the vacuum pressure in the vapor line, the vapor pressure in the storage tank, and the fuel pressure in the supply line, may be effectively controlled to facilitate efficient recovery of fuel vapor from fuel dispensing assemblies, such as coaxial hoses and nozzles. Thus, a vapor recovery system in accordance with the present invention may enable recovery of at least about 95 percent of the fuel vapors emitted during fuel delivery, and more preferably at least about 98 percent.

In some embodiments, the vacuum jet pump includes a housing comprising a main body, a top cap, and a lower cap. The main body may have a surge chamber, and an upper and lower central conduit. When assembled an upper diaphragm assembly is secured between the top cap and the main body and a lower gasket is secured between the lower cap and the main body. The main housing body may include a control valve having a pilot valve and spring that is biased towards the base and may allow fluid to exit the vacuum jet when the fluid pressure on the pilot valve is sufficient to displace the valve against bias. The fluid may then enter a low-pressure chamber and expand to create a turbulent flow. The turbulent flow may interact with an aerator which is operable to reduce the pressure and increase the velocity such that the fluid is uniform before interacting with a converging nozzle. The fluid exiting the jet nozzle is operable to pull a vacuum on the surge chamber and consequently the vapor return inlet. The surge chamber may be in communication with a lower diaphragm cavity. The diaphragm assembly may have a flexible gasket and a control rod the enters in and out of the jet nozzle thereby controlling the vapor jet output.

It is an aspect of the present invention to provide a vapor recovery system for a mobile fueler during a fuel operation, comprising a vacuum jet pump comprising a housing body, having a vapor recovery inlet and a liquid fuel inlet, a surge cavity, an ullage pressure channel, a mixing channel, a housing collar, an upper central cylindrical conduit, and a lower cylindrical conduit; a diaphragm assembly having a collar securing a control rod in the center of a diaphragm gasket and a spring; an upper housing cap having an ullage pressure port and being operable to secure the diaphragm assembly against the housing body to provide a fluid-tight seal, the diaphragm assembly gasket defining an upper diaphragm cavity and a lower diaphragm cavity; a control valve having a pilot valve, a flow gate, a central shaft conduit, and a spring seat securing a control spring, wherein the control valve may be positioned in the upper central cylindrical conduit and the control spring interfaces with the housing collar; an aerator having a central shaft conduit having a central shaft and a converging nozzle conduit operable to be sealed by said control rod, where the aerator and converging nozzle secure to lower cylindrical housing conduit; and a lower housing cap having a vapor return line and an ullage pressure port, the may be operable to secure a lower housing gasket to the housing body and provide a fluid-tight seal; a mobile fueler having a storage tank in communication with a supply pump that is operable to deliver fuel through a supply line to a fuel dispensing assembly having a vapor recovery inlet; a fuel diverter line in communication with said supply line and the housing liquid fuel inlet, and a vapor recover line connecting said vapor recovery inlets of the housing and fuel dispensing assembly; wherein the diaphragm assembly is normally open and during a fuel operation liquid fuel fills the upper central cylindrical conduit and provides a fluid pressure operable to overcome the control spring bias and allow liquid fuel to pass through the fuel gate and the aerator is operable to provide a developed uniform flow to the converging nozzle and rapidly expands in the mixing chamber thereby generating a vacuum on the surge chamber and depositing the fluid vapor mixture into the storage tank.

In another aspect of the vapor recovery system for a mobile fueler during a fuel operation the system may further comprise a vapor channel connecting the surge chamber to the lower diaphragm cavity. The surge chamber and lower diaphragm cavity have a substantially equivalent pressure and the vacuum may be operable to pull the diaphragm gasket down when a vacuum threshold is reached, thereby controlling the liquid fuel exiting the converging nozzle. The system may further comprise, a u-cup gasket on the control valve above the pilot valve, that is operable to provide a fluid tight seal with the upper central cylindrical conduit surface, an O-ring gasket positioned below the flow gate that is operable to provide a fluid-tight seal with the upper central cylindrical conduit. The ullage pressure channel may be in communication with the ullage space tank pressure of a storage tank and may be operable to provide a pressure differential for diaphragm compression. The vacuum pressure may be in a range of about −34 inches w.g. and about −75 inches w.g. and said vacuum threshold is at about −70 inches w.g. The vapor recovery line may be in communication with a vapor pot between the housing and fuel dispensing assembly and may be operable to separate liquid fuel from vapor. The vapor line may recover at least about 95% of the fuel vapor from the fuel dispensing assembly. The vacuum pump may be mounted at a level higher than the liquid region of the storage tank. The fuel dispensing assembly may include a coaxial hose and nozzle, a hose reel for storing the coaxial hose, and a vapor adapter splitter valve. The coaxial hose has a length between 22 feet and about 50 feet. The fuel dispensing assembly may further include a vapor adapter splitter valve for separating the vapor line from the supply line. The fuel gate may be operable to generate a turbulent flow in a space between the aerator and the fuel gate and the aerator may be operable to linearize the flow field of the fluid and reduce the pressure of the fuel thereby increasing the velocity of fuel and the vacuum pressure. The aerator and converging nozzle may secure to the central housing conduit with a retention ring. The supply pump is operable to provide a liquid fuel pressure between 26 and about 40 psi in said supply line.

It is an object of the present invention to provide a vapor recovery system that requires less fuel diverted from a supply line, thereby improving the total efficiency of a mobile fuel system and reducing carbon emissions.

The present invention provides an improved mobile or subsurface vapor recovery system incorporating a vacuum jet pump that efficiently recovers vapor from the ullage space of a tank. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

DETAILED DESCRIPTION OF THE DRAWINGS

Figure 1:
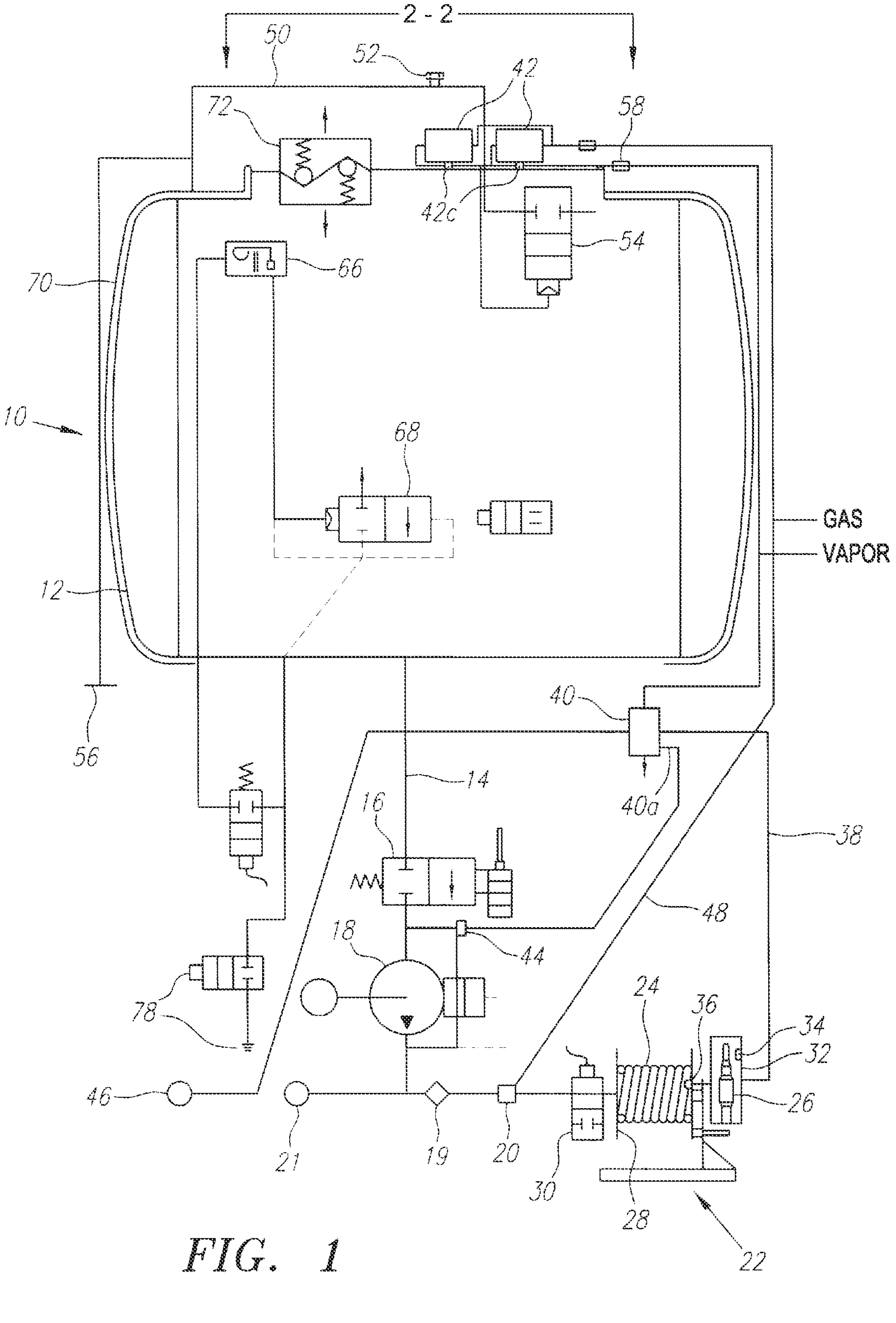
FIG. 1 is a schematic view of a mobile fuel delivery and vapor recovery system, in accordance with the present invention.

Reference will now be made in detail to certain embodiments of the invention, examples of which are illustrated in the accompanying drawings. While the invention will be described in reference to these figures and certain implementations and examples of the embodiments, it will be understood that such implementations and examples are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. References to various features of the "present invention" throughout this document do not mean that all claimed embodiments or methods must include the referenced features. It will be apparent to one skilled in the art that the present invention may be practiced without these specific details or features.

Reference will be made to the exemplary illustrations in the accompanying drawings, and like reference characters may be used to designate like or corresponding parts throughout the several views of the drawings.

Figure 2:
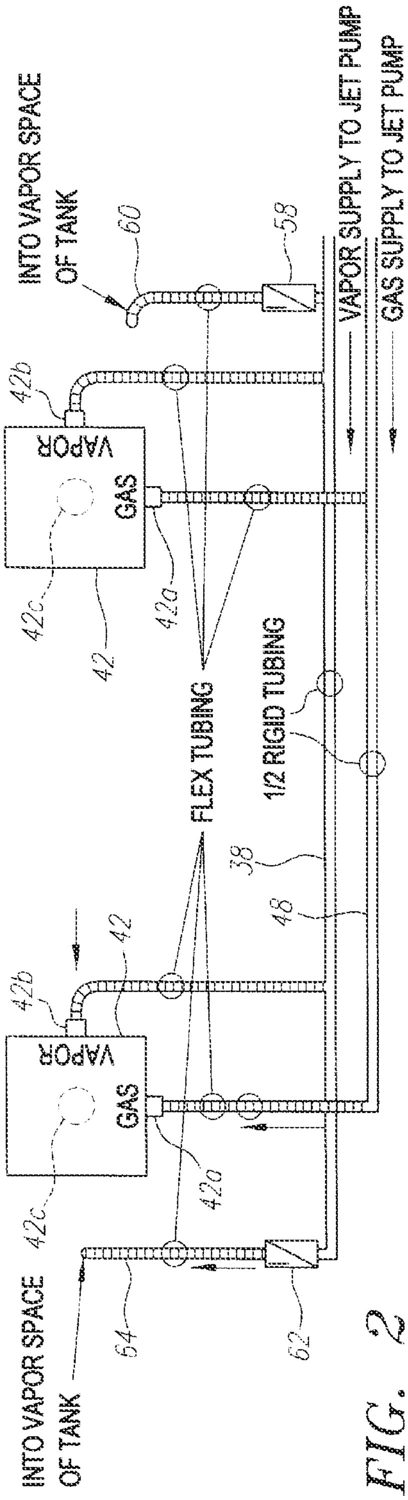
FIG. 2 is a top view of the system of FIG. 1, taken along line 2-2.

As shown in FIGS. 1-2, a mobile fuel delivery and vapor recovery system 10, in accordance with one aspect of the present invention. Generally, the system 10 includes a storage tank 12, a supply line 14 that extends from the storage tank 12 through a shut off valve 16, a supply pump 18, a fuel filter 19 and a diverter valve 20 to one or more fuel dispenser assemblies 22. A pressure gauge 21 may be provided to monitor pressure in the supply line 14 downstream of the supply pump 18. The storage tank 12 is preferably mounted on a vehicle, such as a fuel delivery truck (not shown), and may have a capacity of between about 500 gallons and about 4,000 gallons, preferably between about 700 gallons and about 1,200 gallons, and more preferably about 700 gallons.

The fuel dispenser assembly 22 generally includes a length of coaxial hose 24 terminating in a fuel dispensing nozzle 26. The fuel dispensing nozzle 26 may be one of a variety of conventional nozzles, for example, having an inner spout, which may be inserted into the inlet of a vehicle fuel's tank, and an outer vapor conduit or boot assembly (not shown). Additional information regarding fuel dispensing nozzles appropriate for use with the present invention may be found, for example, in U.S. Pat. Nos. 4,068,687, 5,174,346, 5,178,197, and 5,327,944, the disclosures of which are expressly incorporated herein by reference.

Figure 3:
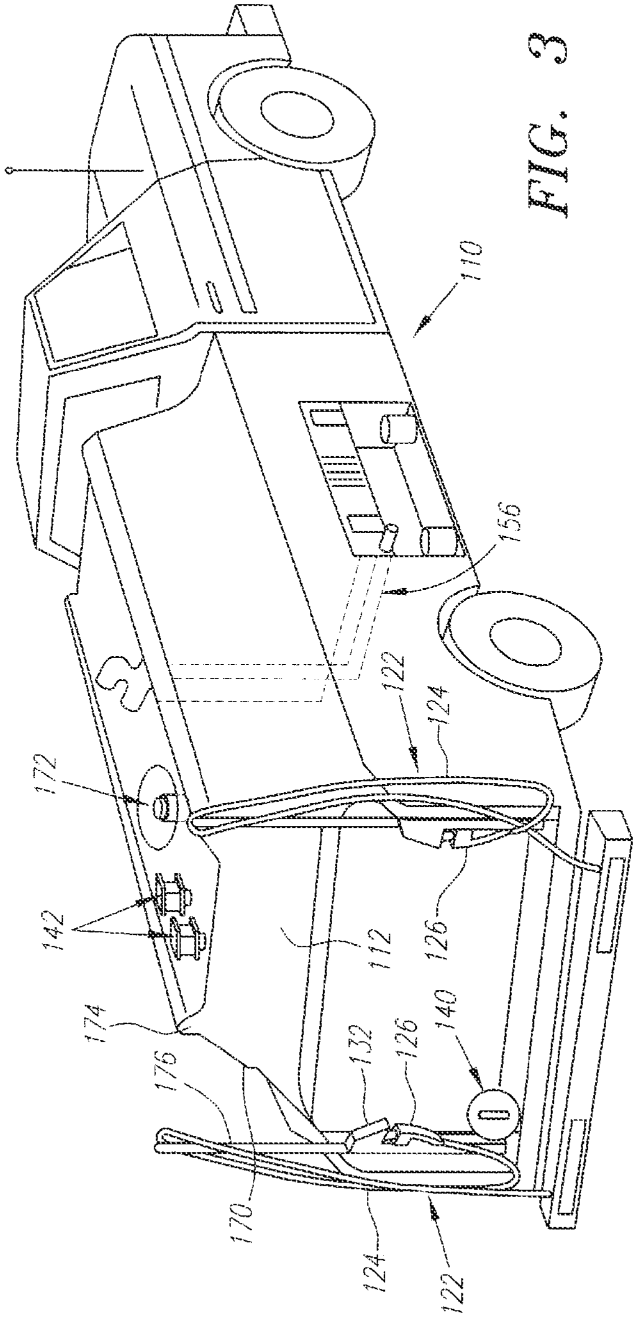
FIG. 3 is a perspective view of a fueling truck including a vapor recovery system in accordance with the present invention.
Figure 4:
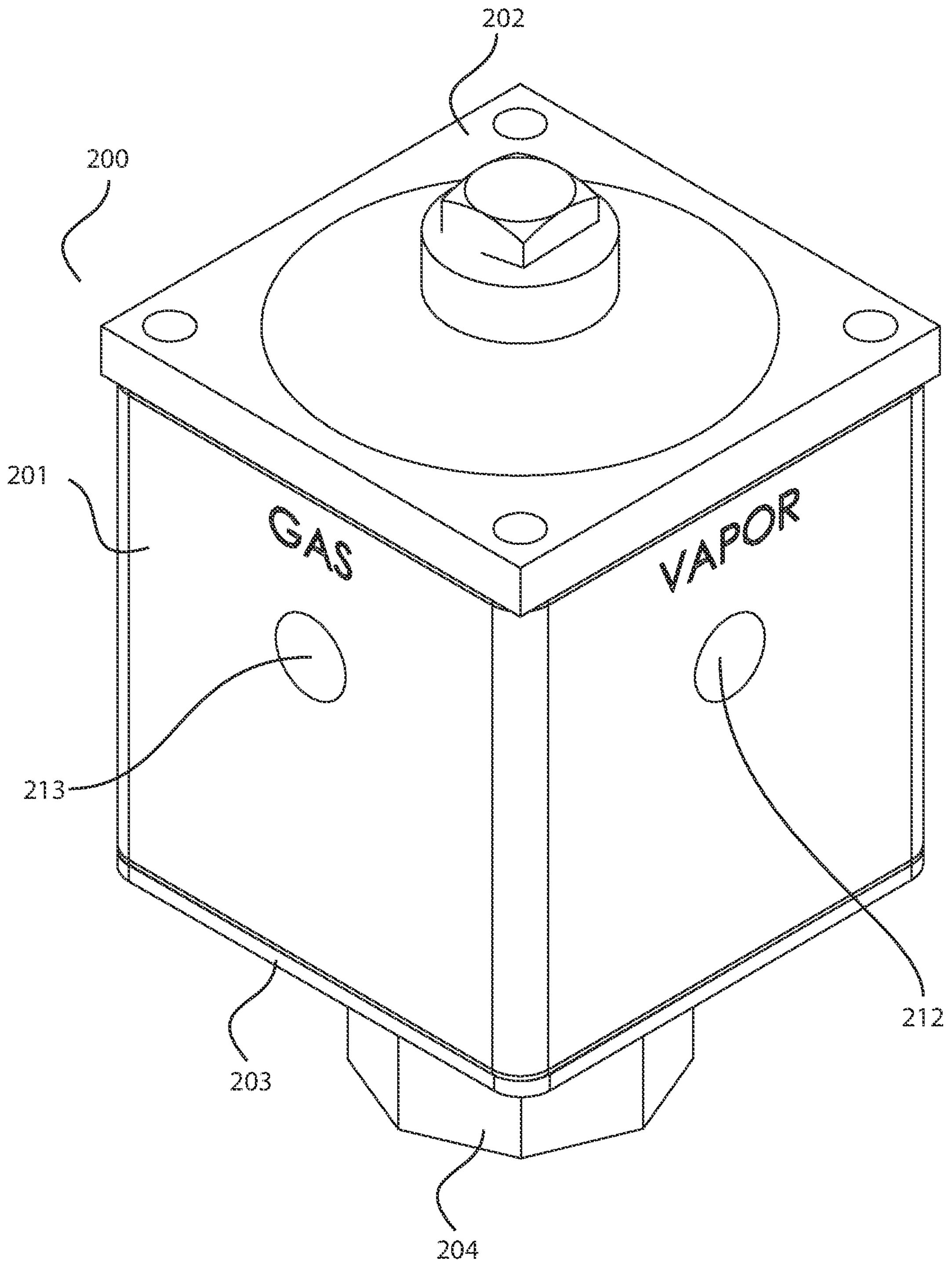
FIG. 4 provides a perspective view of a vapor recovery system, in accordance with the present invention.

In some embodiments, the fuel dispensing assembly 22 includes a hose reel 28 for storing the hose 24 when not in use, or alternatively, a hose retractor assembly, such as hose retractor 176 shown in FIG. 3. The hose 24 may have a length of not more than about 50 feet, and in some embodiments a length of not more than about 22 feet. The fuel dispensing assembly 22 may also include a shut off valve 30 which may be opened when the nozzle 26 is removed from a nozzle hood 32 and/or may be activated by a switch 34. The fuel dispensing assembly 22 also includes a vapor adapter splitter valve 36 connected to the coaxial hose 24 for separating a vapor line 38 from the supply line 14.

The vapor line 38 extends through a vapor pot 40 to a pair of vacuum jet pumps 42 on top of the storage tank 12. Thus, the vapor line 38 communicates from a vapor recovery inlet of the vapor conduit (not shown) on the fuel dispensing nozzle 26 through the coaxial hose 24 and the vapor pot 40 to the vacuum jet pumps 42.

The vapor pot or "drop out" box 40 is configured to remove liquid fuel from the fuel vapor in the vapor line 38, for example, to separate liquid fuel that may be pulled into the vapor recovery inlet of the nozzle 26 and/or that may condense in the vapor line 38. In some embodiments, the vapor pot 40 is mounted such that it is located at the lowest point in the vapor line 38, such that any liquid in the vapor line 38 will tend to flow into the vapor pot 40 under gravity, e.g., due to the weight of the liquid, thereby facilitating separation of liquid fuel from the vapor.

The vapor pot 40 may also be connected to the supply line 14, for example, to return the separated liquid fuel back into the supply line 14. For example, a liquid fuel outlet 40*a* of the vapor pot 40 may be connected through a siphon check valve 44 into the supply line 14 upstream of the supply pump 18. A vacuum gauge 46 may be connected to the vapor pot 40 to monitor the vacuum pressure therein.

The vacuum jet pumps 42 are generally connected to the vapor pot 40, the diverter valve 20, and to the storage tank 12. For example, as shown in FIG. 2, a fuel diversion line 48 may extend from the diverter valve 20 (not shown in FIG. 2), and the fuel diversion line 48 may be connected to a fuel inlet 42*a* of each vacuum jet pump 42. A vapor inlet 42*b* of each vacuum jet pump 42 may be connected to the vapor line 38, and an outlet 42*c* of each vacuum jet pump 42 may be connected to the storage tank 12, preferably to deliver the recovered vapor into the vapor region of the storage tank 12.

A vacuum relief check valve 58 may be provided in the vapor line 38 to prevent the pressure in the vapor line 38 from exceeding a desired vacuum level. For example, the vacuum relief check valve 58 may be mounted in line with a branch 60 that extends from the vapor line 38 into the storage tank 12, and preferably into the vapor region of the storage tank 12. If the vacuum in the vapor line 38 produced by the vacuum jet pumps 42 exceeds a desired vacuum pressure level, the vacuum relief check valve 58 will open to draw vapor from the vapor region of the storage tank 12 into the vapor line 38 until the vacuum is lowered down to the desired level. In some embodiments, the vacuum relief check valve 58 is set to open if the vacuum pressure in the vapor line 38 exceeds −100 inches of water column. In some embodiments, the check valve 58 may open if the vacuum pressure in the vapor line 38 exceeds −80 inches of water column.

A check valve 62 may be provided in the vapor line 38, which may be in line with a branch 64 that extends into the storage tank 12, and may extend into the vapor region of the storage tank 12. The check valve 62 may act to balance the vacuum pressure within the vapor line 38 within a desired range, such as the ranges described further below.

Returning to FIG. 1, the system 10 also generally includes a vapor rail 50 that communicates with the storage tank 12, preferably above the maximum level of liquid fuel in the storage tank 12, e.g., in the vapor region of the storage tank 12, and preferably along the top of the storage tank 12. The vapor rail 50 may include a pressure vacuum vent 52 that may open to release vapor from the storage tank 12 if a maximum safety pressure is exceeded, for example, if the vapor pressure in the storage tank 12 exceeds about 8 inches w.g. In some embodiments, the vacuum vent 52 may open if the vapor pressure in the storage tank 12 exceeds about 3 inches w.g. In some embodiments, the vacuum vent 52 may open if the vapor pressure in the storage tank 12 exceeds about 1 inch w.g.

A vapor recovery valve 54 is also connected to the vapor rail 50 which is mounted within the vapor region of the storage tank 12. The vapor recovery valve 54 is activated during fuel delivery, for example, by a nozzle hanger switch (not shown) on the fuel dispensing assembly 22. When the vapor recovery valve 54 is activated, the vapor recovery system is connected to the pressure vacuum vent 52, e.g., the outlets 42*c* of the vacuum jet pumps 42 are connected through the storage tank 12 and the vapor recovery valve 54 to the vapor rail 50. This allows the release of vapor from the storage tank 12, for example, if the vacuum jet pumps 42 increase the vapor pressure in the storage tank 12 above the maximum safety pressure. When fuel is not being delivered from the nozzle 26, the vapor recovery valve 54 closes to substantially isolate the vapor recovery system from the pressure vacuum vent 52.

The storage tank 12 is at least partially covered with a layer of insulation 70 having a predetermined thermal insulating value. Preferably, all exposed areas of the storage tank 12, the vapor line 38 and the fuel diversion line 48 are covered with at least about a one-inch-thick layer of polyurethane foam insulation, thereby providing an insulating thermal resistance value of at least about 14. The layer of insulation 70 helps maintain a lower temperature, and consequently a lower vapor pressure, inside the storage tank 12. Maintaining the vapor pressure inside the storage tank 12 at a low level relative to the vacuum jet pumps 42 enables a vacuum in the vapor line 38 sufficient to pull vapor from the nozzle 26 and direct it into the storage tank 12.

In addition, the storage tank 12 may include other features useful for its operation, particularly when the storage tank 12 itself is being filled with fuel prior to use. For example, a Phase I vapor adapter 56 may be connected to the vapor rail 50. The Phase I vapor adapter 56 may be configured for bottom loading, e.g., being mounted below the bottom of the storage tank 12. The Phase I vapor adapter 56 may allow the vapor rail 50 to be connected to the vapor recovery system of a stationary fuel source to evacuate vapor from the storage tank 12 as it is being filled with liquid fuel. A pressure-vacuum vent 72 may be mounted directly on the top of the storage tank 12 to release vapor if a maximum safety pressure, e.g., 18 inches w.g., is exceeded when the storage tank 12 is being filled.

A float valve 66 may be provided in the storage tank 12 that is connected to an automatic shut off valve 68 for automatically stopping fuel delivery into the storage tank 12 to prevent overfilling. For example, a nozzle from a stationary fuel source, such as a large capacity fuel storage tank (not shown), may be connected to an inlet 78 of the storage tank 12 to fill the storage tank 12 with fuel. The float valve 66 will float on top of the fuel, and when it engages a stop-plate (not shown) at the top of the storage tank 12, the automatic shut off valve 68 will close to discontinue fuel delivery automatically.

During use of the system 10 to deliver fuel to a vehicle (not shown), the nozzle 26 is removed from the nozzle hood 32, and the supply spout inserted into the vehicle's fuel tank inlet. The shut off valve 30 may be opened automatically upon removal of the nozzle 26 from the nozzle hood 32 and/or may be activated by the switch 34. The vapor recovery valve 54 may consequently be opened such that the vacuum jet pumps 42 communicate with the vapor rail 50.

The supply pump 18 may be activated by removal of the nozzle 26, or may be previously activated, for example, manually. The supply pump 18 generates a fuel pressure within the supply line 14 to deliver fuel to the fuel dispensing assembly 22, and may generate a fuel pressure in the fuel diversion line 48. In some embodiments, the pressure ranges from between about 20 psi and about 40 psi when the nozzle 26 is open, and more preferably between about 22 psi and about 26 psi.

The resulting fuel pressure drives the vacuum jet pumps 42 to create a vacuum in the vapor line 38 between about −20 inches w.g. and about −70 inches w.g. when the nozzle 26 is open. In some embodiments, the vacuum pressure may be between about −20 inches w.g. and about −40 inches w.g. In further embodiment, the vacuum pressure may be between about −27 inches w.g. and about −34 inches w.g. When the nozzle 26 is closed, the pressure in the fuel diversion line 48 may create a vacuum in the vapor line 38 between about −20 inches w.g. and about −80 inches w.g. In some embodiments, the vacuum pressure in the vapor line 38 may be between about −40 inches w.g. and about −72 inches w.g. In further embodiments, the vacuum pressure in the vapor line 38 may be between about −65 inches w.g. and about −72 inches w.g.

The vacuum created by the vacuum jet pumps 42 pulls vapor emitted from the supply spout into the vapor recovery inlet of the nozzle 26, preferably recovering at least about 94.5 percent of the vapor. In some embodiments, at least about 98 percent of the vapor is recovered. These high levels of vapor recovery efficiency are achieved primarily due to the unique combination of features comprising the system 10.

For example, it is important that the system 10 facilitates control of the vapor pressure within the storage tank 12 and of vacuum pressure within the vapor line 38. In order for the system 10 to effectively recover vapor from the nozzle 26, the vacuum pressures created by the vacuum jet pumps 42 must be substantially higher than the vapor pressure within the storage tank 12. At the same time, the vapor pressure within the storage tank 12 must be maintained at relatively low, substantially safe levels. The insulation on the storage tank 12, the fuel diversion line 48 and the vapor line 38 substantially minimizes heating of the interior of the storage tank 12 which may increase vapor pressure therein, thereby reducing the overall vacuum requirements to recover vapor efficiently.

The system 10 also allows use and effective control of fuel pressure from the supply pump 18 to drive the vacuum jet pumps 42 without substantially interfering with the supply line 14, thereby facilitating control of the vacuum produced in the vapor line 38. A relatively small amount of fuel may be diverted from the supply line 14 to the vacuum jet pumps 42 to create sufficient vacuum that efficiently draws vapor from the nozzle 26. Thus, by effectively minimizing the vapor pressure encountered in the storage tank 12, the vacuum jet pumps 42 may efficiently draw vapor from the nozzle 24 through the vapor line 38 and into the storage tank 12. The efficiency of the system 10 may be such that certain components used in conventional mobile fuelers, such as a vapor rail and/or a pressure vacuum vent, are unnecessary and may be eliminated.

In accordance with another aspect of the present invention, a kit is provided that may be used for retrofitting an existing mobile fueler, which may not already be equipped with a vapor recovery system. At a minimum, the kit may include one or more vacuum jet pumps, a diverter valve, a vapor pot, and one or more fuel dispensing assemblies. Preferably, the kit also includes valves for controlling pressure within the supply and vapor lines, and insulation for covering desired components to reduce vapor pressure in the system.

For example, as shown in FIG. 3, the kit may be used to retrofit an existing fuel truck 110, which may include an uninsulated storage tank 112 and a supply line. The supply line generally includes a supply pump, a fuel filter, and one or more single wall hoses and nozzles (all not shown). The fuel truck 110 may also include a vapor rail (not shown), which may be below turn-over rails 174 on the storage tank 112, to which a Phase I vapor adapter 156, and a pressure-vacuum vent 172 may be connected.

The single wall hoses and nozzles may be removed, and optionally the vapor rail and/or pressure vacuum vent may be removed. The diverter valve is mounted in the supply line, may be downstream from the supply pump and fuel filter, but before any metering equipment. A fuel dispensing assembly 122 is attached to the fuel truck 110, or alternatively a pair of fuel dispensing assemblies 122 may be mounted, as shown. Each fuel dispensing assembly 122 may include a coaxial hose 124, a hose retractor assembly 176, a coaxial fuel dispensing nozzle 126, and a nozzle hood 132. Alternatively, a reel assembly (not shown) may be provided instead of the hose retractor assembly 176. The fuel dispensing assembly 122 may also include a vapor adapter splitter valve (not shown) for converting the coaxial hose to a pair of single wall connectors, e.g., a supply connector and a vapor connector. The supply line is extended from a main supply outlet of the diverter valve to the supply connector of the vapor adapter splitter valve.

A vapor pot 140 is mounted at a low point in the system, in some embodiments below the bottom of the storage tank 112, and a vapor line is connected from the vapor connector of the vapor adapter splitter valve to an inlet of the vapor pot 140. A siphon check valve may be connected between a liquid outlet of the vapor pot 140 and the supply line, preferably before the supply pump.

One or more vacuum jet pumps 142 are mounted on the truck 110, e.g., on the storage tank 112 between the roll-over rails 174. A vapor outlet of the vapor pot 140 is connected to a vapor inlet of each vacuum jet pump 142. The outlet of each vacuum jet pump 142 is connected to the storage tank 112, e.g., dropping vertically downward from the vacuum jet pumps 142 into the vapor region of the storage tank 112. A vacuum relief check valve (not shown) may be connected in parallel with the vacuum jet pumps 142 between the vapor line and the storage tank 112, to prevent excessive vacuum pressure in the vapor line. Similarly, a fuel pressure check valve (not shown) may be connected in parallel with the vacuum jet pumps 142 between the fuel diversion line and the storage tank 112.

FIGS. 4-9C an auxiliary vapor recovery device for use with a fuel dispensing system, comprising a vapor recovery pump operable to return a hydrocarbon vapor/air mixture displaced by fuel delivery to the ullage space of the storage tank system to the main supply tank. The embodiment of vapor recovery pump 200 may substitute the vacuum jet pump 42 in the description of FIGS. 1-3, with the added benefits herein.

Figure 5:
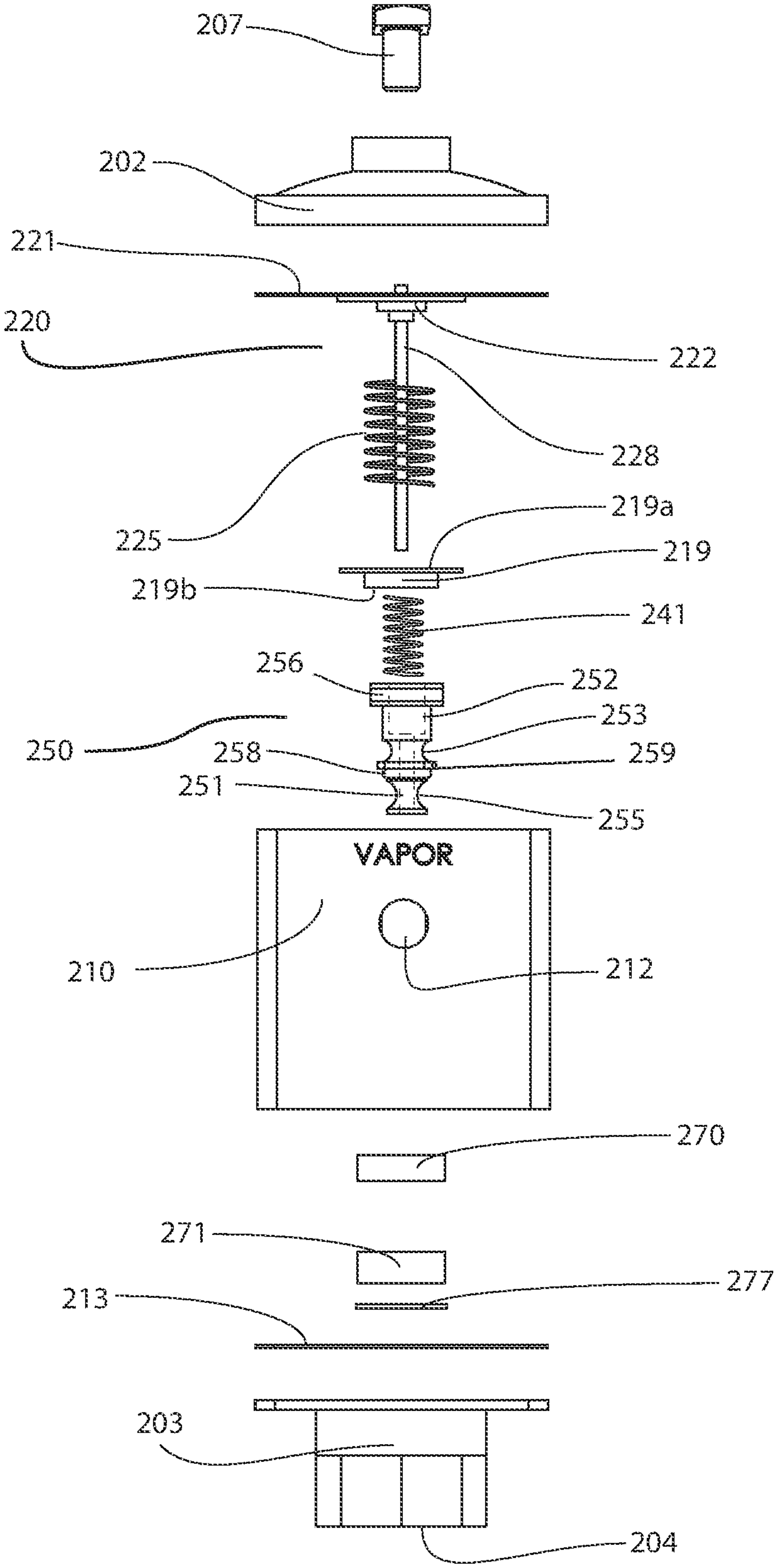
FIG. 5 provides an exploded perspective view of a vapor recovery system, in accordance with an embodiment of the present invention.

In some embodiments, a vapor recovery pump 200 (e.g., vacuum jet pump) may include a housing 201, a diaphragm assembly 220, and a control valve assembly 250, best shown in FIG. 5. The housing 201 may include a housing body 210 having a vapor return inlet 212, and a gas inlet 211 positioned on different faces of the housing body, for example, having a 900 relationship to each other with respect to the center line 200*c*, best shown in FIG. 4 and FIG. 9B. The housing body 210 may have an upper housing cap 202 and a lower housing cap 203, the upper housing cap may have a plug 207, and the lower housing cap 203 may have a vapor jet output connector 214 and a tank case opening connector 217. The upper housing cap plug 207 may be removed, and a bolt (not shown) may be exposed for calibrating the spring tension and depth of the needle rod 228 of the diaphragm assembly. The two lower housing connectors 214 and 217 may be concentric to each other, and the centerline 200*c*, the vapor jet output connector 214, may be recessed with respect to the edge flange 204 of the tank case opening connector 217. The vapor jet output connector 214 couples a vapor fluid return pipe 214*p* that extends past the fluid level and deposits excess fluid into the main storage tank. The housing top cap 202 and body 210 secure an upper gasket or diaphragm gasket 221. The diaphragm gasket 221, a component of the diaphragm assembly 220, may provide an upper and lower cavity 230 and 231. The housing body 210 and the lower housing cap 203 may have a lower gasket 213 operable to provide a fluid-tight seal along the periphery of the housing 200. The vapor return inlet 212 may be in communication with various chambers in the housing, a large main housing chamber 232 (e.g., surge chamber) and a vapor channel 234 may connect to the lower diaphragm cavity 231, and the housing chamber 232 may have a vapor orifice 236*c* for porting vapor to the mixing chamber 236.

Figure 6:
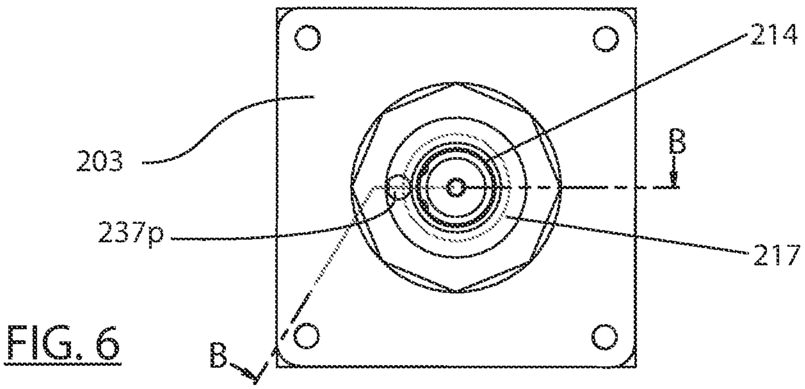
FIG. 6 provides an elevated perspective view of a bottom surface of a vapor recovery system, in accordance with the present invention.
Figure 6B:
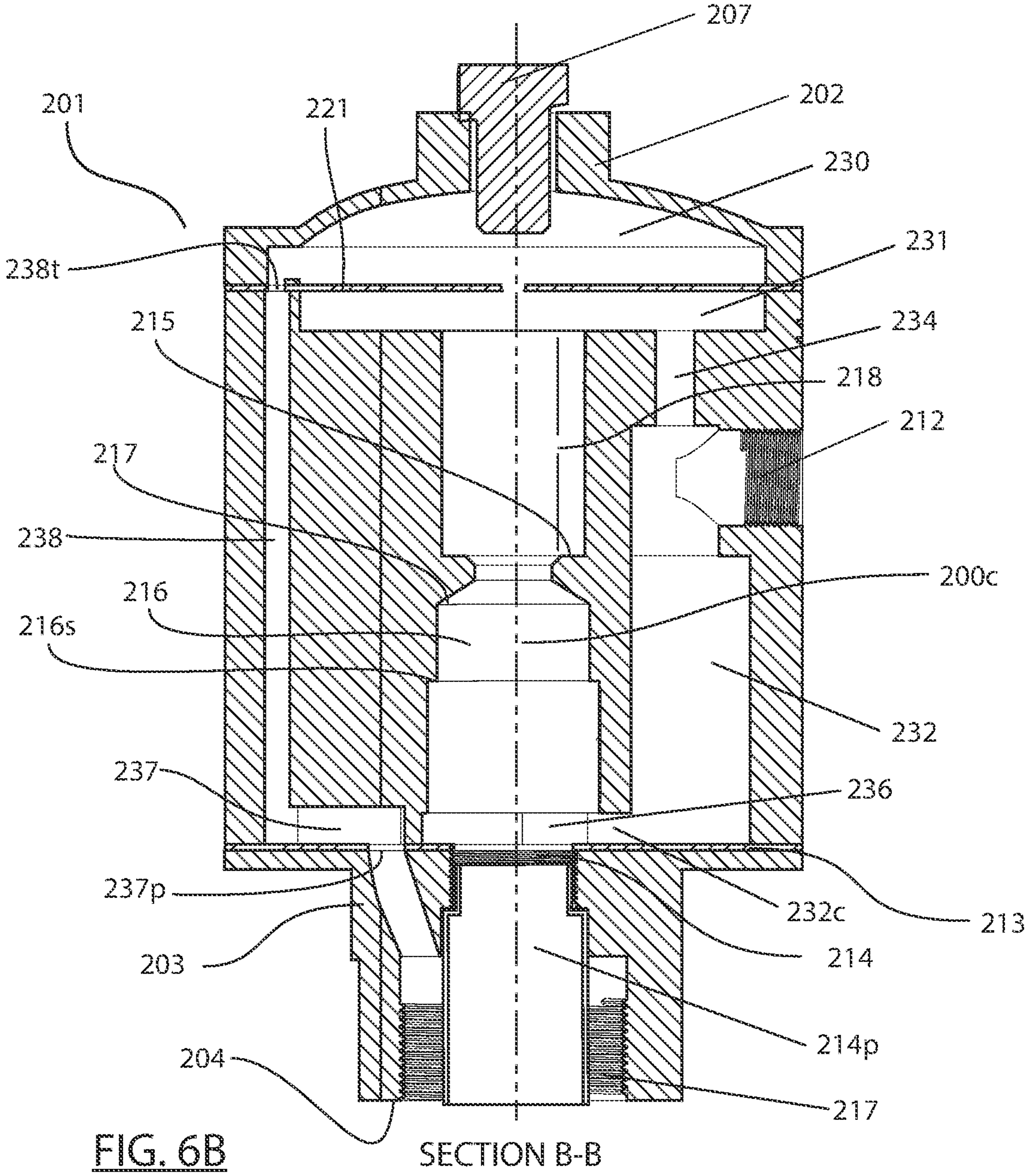
FIG. 6B provides a sectional perspective view of a vapor recovery system housing about the cross-sectional line B-B of FIG. 6, in accordance with the present invention.

FIG. 6B shows an illustrated view of the vapor recovery pump 200 with the diaphragm assembly 220 and the control valve assembly 250 removed from the housing 210. The upper diaphragm cavity 230 may have a pressure relative to the ullage pressure in the primary storage tank 12 and is partitioned by the diaphragm gasket 221 and the interface of the housing 210 and the upper housing cap 202. The housing body 210 may have a channel 238 that connects the upper diaphragm cavity 230 to pressure in the return tank 12 and may be operable to allow for the expansion and contraction of the diaphragm gasket 221, the upper diaphragm cavity 230 may feed into a channel 237 that terminates into the port 237*p* which communicates the vapor pressure of a supply storage tank 12 to the upper diaphragm cavity 230. In some embodiments, the port 237*p* may vent to the atmosphere and operate under similar conditions as connected to the fuel storage tank.

Figure 7A:
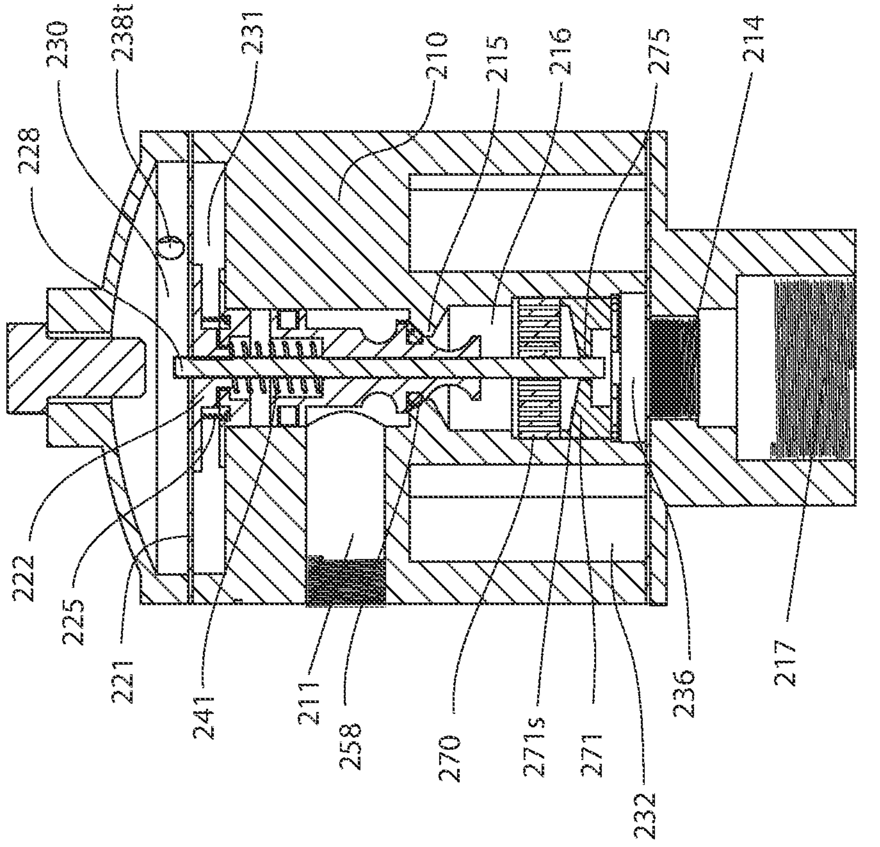
FIG. 7A provides a sectional perspective view of a vapor recovery system about the cross-sectional line A-A of FIG. 7, in accordance with the present invention.

The diaphragm assembly 220 may include a diaphragm gasket 221, a collar 222, and a nut (not shown) securing a needle rod 228 (e.g., control shaft) to the diaphragm assembly, as shown in FIG. 7A. A diaphragm spring 225 may be positioned around the needle rod 228, nest into a recess on the collar 222, and compress against an upper spring seat 219*a* of a housing collar 219. The diaphragm spring 225 may bias the diaphragm assembly 220 towards the housing top cover 202. On the opposite side of the housing collar 219, a lower spring seat 219*b* may secure a control spring 241 that anchors into a cylindrical recess 252 of the control valve 250. The control valve assembly 250 may include a pilot valve 253, a flow gate 255, a u-cup 256, an O-ring 258, and an interior shaft conduit 251 for the needle rod 228. The control spring 241 may bias the control valve 250 towards the bottom housing cap 203 along the translating region 218. The spring coefficient of the control spring 241 may determine the pressure of the fluid from the gas inlet 211 necessary to open the control valve 250. The housing body 210 may have a control valve O-ring seat 215 that provides a fluid-tight seal with the O-ring 258 when in the closed position. The u-cup gasket 256 may be operable to provide a seal against the side wall 218 because the surface contact of the u-cup 256 is more significant than the surface contact of the o-ring 258 against the O-ring seat 215. The u-cup 256 is operable to prevent fluid from penetrating up through the housing collar 219. A bottom end of the housing body 210 may have an expansion chamber 216, and a lower shelf 216*s* for securing an aerator 270 in line with the control valve flow gate 255. Thereafter, a spacer 271 having a central jet orifice 275 is positioned against the aerator 270 and secured to the housing body with an internal retaining ring 277.

The aerator 270 may be an insert with a plurality of individual conduits that is operable to rapidly create a uniform flow in the fluid before interacting with the spacer 271. The spacer 271 may have a converging surface 271*s* leading to the central jet orifice 275. The space between the jet orifice 275 and vapor fluid return pipe 214*p* may be the mixing chamber 236, which is operable to merge vapor fluid with liquid fuel from the central jet orifice 275, in a similar fashion to a venturi tube. In some embodiments, there may be a rubber damper (not shown) positioned between the control spring 241 and the cylindrical recess 252, that is operable to absorb translating forces to the housing collar 219.

Figure 7:
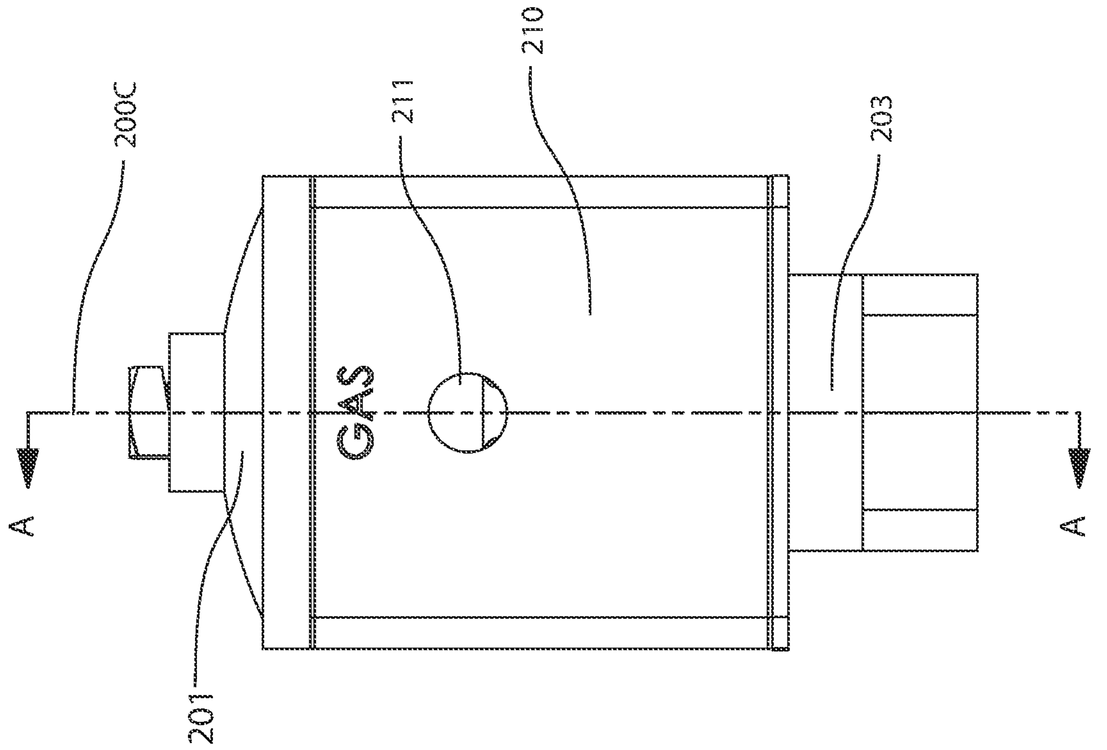
FIG. 7 provides an elevated perspective of a surface of a vapor recovery system, in accordance with the present invention.
Figure 8B:
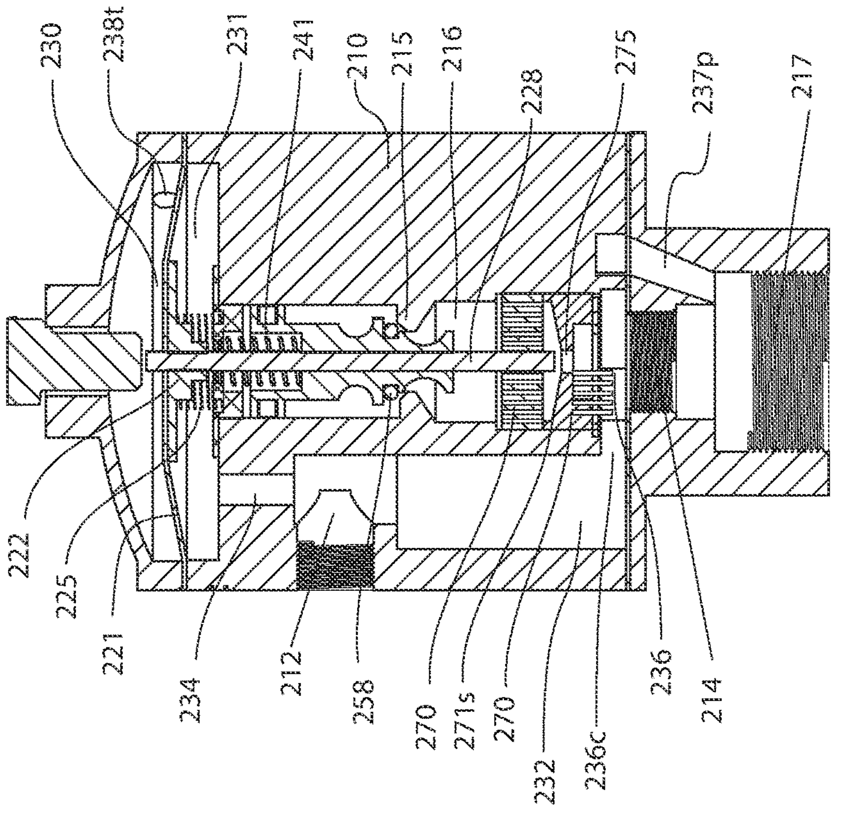
FIG. 8B provides a sectional perspective view of a vapor recovery system about the cross-sectional line B-B of FIG. 6, in accordance with the present invention.
Figure 8:
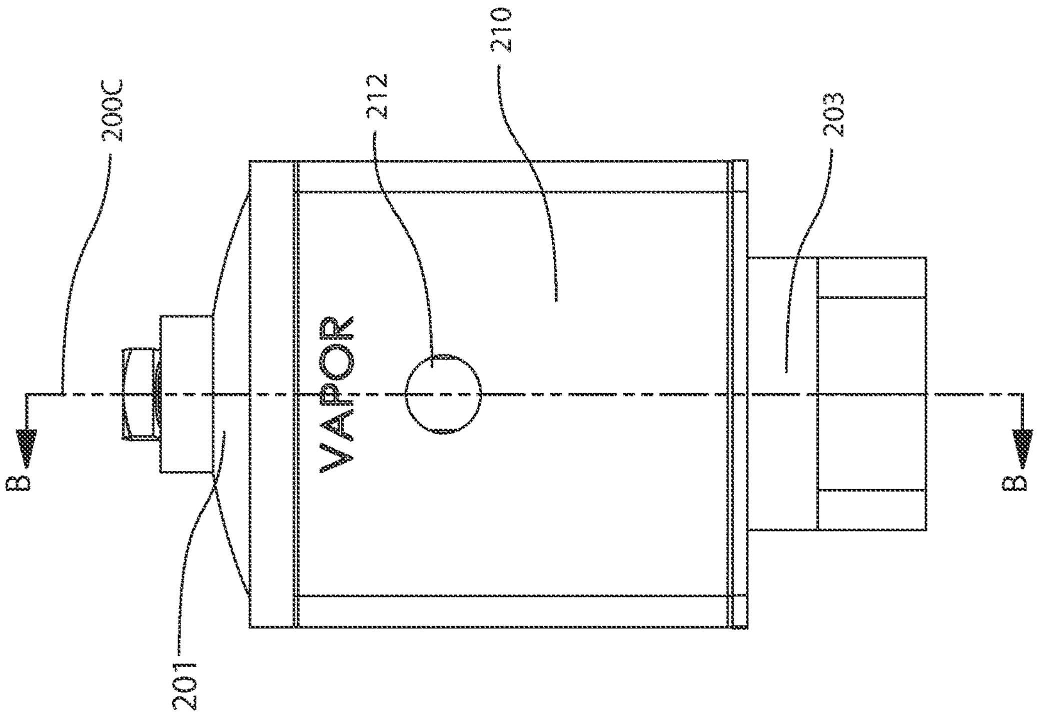
FIG. 8 provides an elevated perspective of a surface of a vapor recovery system, in accordance with the present invention.

FIG. 7 provides a surface view of the housing body 210 on the gas inlet connector inlet 211 surface of the vacuum recovery pump 200. FIG. 7A provides a cross-section view of the vacuum recovery pump 200 about the centerline 200*c* shown in FIG. 7. The control valve 250 is shown in the closed position where the O-ring 258 is compressed against the O-ring seat 215. FIG. 8 provides a surface view of the housing body 210 on the vapor return connector inlet 212 surface of the vacuum recovery pump 200. FIG. 8A provides a cross-section view about the centerline 200*c* shown in FIG. 8. The control valve 250 is shown in the open position allowing liquid fluid to pass between the flow gate 255 and the casing O-ring seat 215. The flexible diaphragm gasket 221 allows the needle rod shaft 228 to translate out of the jet nozzle 275, thereby allowing fluid to expand in an expansion chamber 216 rapidly. The rapid expansion of a volatile fluid may form localized pressure drops and cavitations may form in the fluid. The aerator 270 may be operable to reduce the impact of cavitations on metal structures and may increase the velocity of the fluid before interacting with the converging surface 271*s* of the spacer 271 and exiting the jet nozzle 275. The fluid exiting the vapor jet nozzle 275 may be injected into a mixing chamber 236, where vapor fluids mix with the jet stream and return to the main fuel tank.

Figure 9:
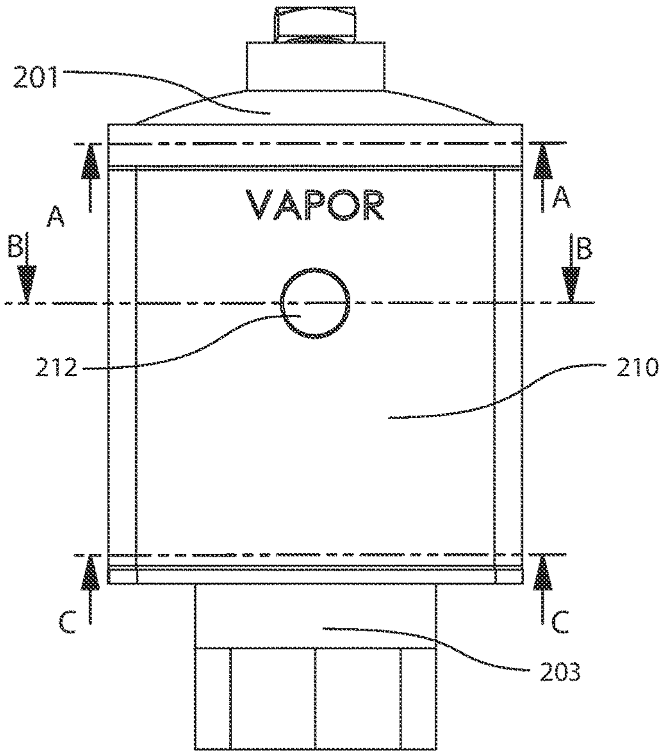
FIG. 9 provides an elevated perspective of a surface of a vapor recovery system, in accordance with the present invention.
Figure 9A:
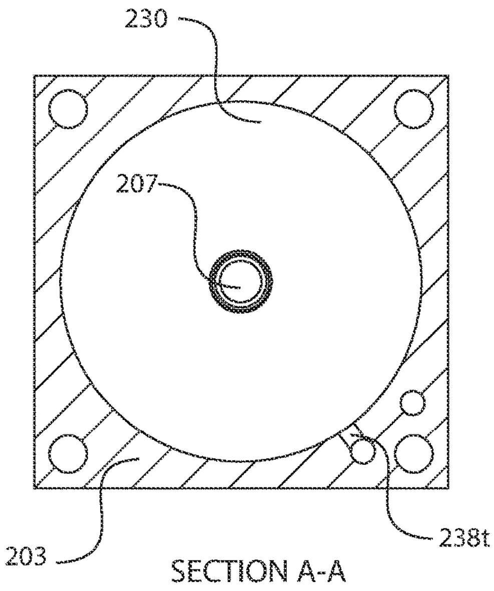
FIG. 9A provides a perspective view of a vapor recovery system about the cross-sectional line A-A of FIG. 9, in accordance with the present invention.
Figure 9B:
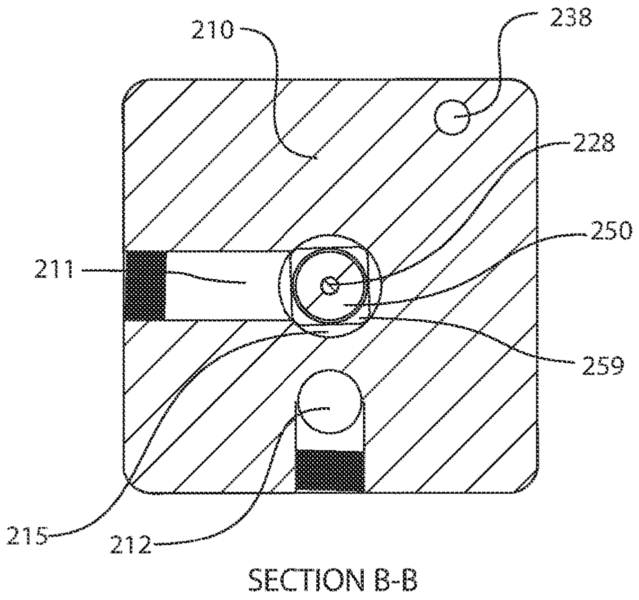
FIG. 9B provides a perspective view of a vapor recovery system about the cross-sectional line B-B of FIG. 9, in accordance with the present invention.
Figure 9C:
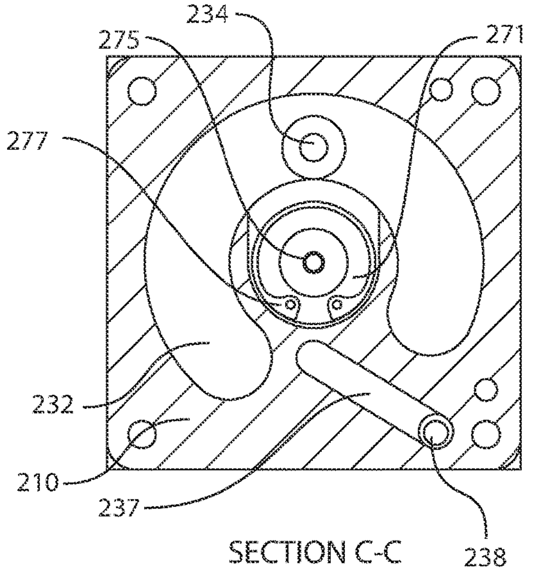
FIG. 9C provides a sectional view of a vapor recovery system about the cross-sectional line C-C of FIG. 9, in accordance with the present invention.

FIGS. 9 and 9A-9C provide various cross section views of the vapor recovery pump 200. FIG. 9A provides a section A-A of FIG. 9 and illustrates an elevated bottom view of the upper housing cap 201. The upper diaphragm chamber 230 may be in communication with a channel 238*t* positioned on the housing cap 201 and is further in communication with the vertical housing channel 238, allowing the upper chamber 230 to share the pressure with the supply tank ullage pressure and allow dampening of the diaphragm membrane. FIG. 9B provides a cross section view along the center line of the vapor return connector 212 and the gas line connector 211. The gas line connector 211 may deposit liquid into the pilot valve 253 concavity of the control valve 250. The vapor return line 212 may deliver vapor fluid to fill the lower diaphragm cavity 231 and the surge chamber 232. The two chambers may be connected by a channel 234. The position of the needle rod 228 may correspond to the spring pressure on the upper diaphragm and the amount of vapor pressure acting on the diaphragm membrane. The mixing chamber 236 may be in the immediate area and region provided after the vapor jet conduit 275. The fluid jet 275 may deposit a fluid flow exiting at a high velocity into the mixing chamber 236, and vapor in the surge chamber 232 region may be pulled into the mixing tube from the vacuum force of the high-velocity flow.

An auxiliary vapor recovery device for use with a fuel dispensing system comprising a dispensing apparatus for delivery of fuel from a storage tank system into a vehicle tank, a recovery device for return of hydrocarbon vapor/air mixture displaced by fuel delivery to ullage space of the storage tank system, is incorporated herein. The vacuum vapor jet device 200 may be coupled to a fueling system to return excess vapor from a fueling operation to a secondary fuel tank system (e.g., vehicle gas tank). As discussed in the disclosure of FIGS. 1-3 a vapor line 38 extends through a vapor pot 40 to the vapor recovery pump 200 and separates liquid fuel from fuel vapor in line 38. The vapor recovery pump 200 may connect to the vapor line 38 at the vapor return inlet connector 212 therebetween, a vacuum relief check valve 58 may regulate the vapor flow into the vapor return inlet 212. The gas inlet connector 211 may receive liquid fuel from a fuel diversion line 48 extending from the diverter valve 20 that is connected to the main hose downstream from the supply pump 18. The vapor recovery pump 200 may connect to the storage tank 12 by threading the bottom housing cap 203 tank case connector 217 to the top of the tank, and the vapor jet output connector 214 may be connected to a vapor jet return line 214*p* that is operable to deposits fuel back into the main storage tank. The vapor jet return line 214*p* may have a diameter smaller than the tank case connector 217 and may have a length such that output fluid deposits at the base of the storage tank 12. The case connector 217 and the return line 214*p*, when secured to the vacuum vapor jet pump 200, may provide adequate space for the port 237, which is exposed to the upper vapor pressure in the storage tank 212 and is operable to provide an equivalent pressure to the upper diaphragm cavity 231.

The vapor recovery pump 200 typically operates when the fuel is pumped from the supply tank 12 to the fuel dispensing assembly 22. In operation, the control valve 250 may have open and closed positions. As shown in FIG. 7B, the control valve 250 is in the closed position, and the O-ring 258 may provide a watertight seal around the O-ring seat 215. The fluid may build up against the pilot valve conduit 253, and the fluid's static pressure is insufficient to overcome the biasing force of the spring 241 on the control valve 250. The diaphragm cavities 231 and 230 may have a fluctuating pressure based on the fuel temperature in the storage tank 12, but the pressure in the system is sufficiently static, and the needle rod 228 may be positioned in the vapor jet orifice 275 and prevent flow through the system. When a fueling operation occurs, fuel in the supply line 14 may be pumped with the supply pump 18, and pressurized fluid may be routed through the diverter valve 20 to the diverter line 48 and up to the gas inlet connector 211. The control valve 250 may be configured in the open position when the fluid pressure on the pilot valve conduit 25 is such that the pressure is operable to overcome the biasing force of the spring 241 and allows fluid to pass between the flow gate 255 and the valve seat 215. Although the control valve 250 may be in the open position, the needle rod 228 may still be in the closed position, and the fluid may build up in space between the jet conduit 275 and valve seat 215, until the pressure in the vacuum surge chamber 232 is reduced.

Simultaneous to the fluid pumping out of the fuel dispensing assembly 22, return vapor from the ullage in the pumping tank may route up through the vapor line 28, to the vapor pot 40, and into the vapor return inlet 212. The vapor return inlet 212 may deposit vapor into the surge chamber 232 (e.g., lower housing cavity) and fill the lower diaphragm cavity 231 through vapor channel 234, the mixing chamber 236 through mixing channel 236*c*. When the vapor fluid exits the inlet 212 the fluid may be exposed to the surge chamber 232 and suddenly expand as it detaches from the boundary of the vapor line 28 and fill the space of the surge chamber 232 and lower diaphragm chamber 231. Because the surface area of the surge chamber has a greater surface area than the cross-sectional area of the vapor line 28 the vapor may have a lower pressure in the surge chamber than in the vapor return line 212. The distance between the vapor return line inlet 212 and the walls of the surge chamber 232 may have proximity such that condensation of the vapor forms on the walls and corners of the surge chamber, and the fluid may be at an equilibrium vapor pressure. The vapor condensation may generate first on the surge chamber 232 surface perpendicular to the vapor return inlet 212 and the corners of the surge chamber may condense following thereafter. The liquid formed on the surface may pool at the bottom surface of the surge chamber 232 and the lower housing gasket 213 and trickle into the vapor jet return line. The diaphragm assembly 220, being initially in the open configuration, may allow the liquid gas to pass through the vapor jet orifice 275 of the spacer 271 and the fluid flow velocity is operable to generate a vacuum in the mixing channel 236*c*. The vacuum may pull vapor from the surge chamber 232 through orifice 236*c*, thereby providing a vacuum or constant suction of vapor from the surge chamber and the vapor return line 212. As the vacuum pulls on the vapor intake 212 increases, condensation in the surge chamber 232 and lower diaphragm 231 may increase. The vapor pressure in the lower diaphragm cavity 231 may decrease, causing a downward pulling force on the diaphragm gasket 231, which is operable to overcome the biasing force of the diaphragm spring 225, therefore moving the needle rod 228 into the jet orifice 275 and either reducing the vacuum or closing off the flow of fluid out of the jet orifice 275.

The fluid in the region after the liquid control valve assembly 250 may pass through an aerator 270, which acts like a flow restrictor that is operable to develop the flow of fluid and reduce the plurality of gas/vapor bubbles or cavitations within the liquid, and this is because the flow area of the aerators 270 individual conduits have a total combined cross-sectional area less than the flow area above and below the aerator. In some embodiments, the aerators may form uniform cavitation upon exiting the individual conduits and a volatile fluid such as gasoline may increase the kinematic interaction of the particles in the flow and allow the gas to uniformly expand in the space between the converging surface of the spacer 271*s* and reduces the pressure before converging on the vapor jet 275, thereby having an increased velocity flow out of the vapor jet nozzle. The fluid output from the vapor jet nozzle 275 may suddenly expand and lead to appreciable viscous forces, and free shear layers form a jet boundary. Such free shear layers are unstable to minor disturbances and roll up into vortices, these cause mixing of the low-velocity fluid in the recirculating zone with the fast flow in the jet. Consequently, the jet spreads and fills the mixing chamber 236, and the shear forces along the walls influence the pressure of the mixing channel 236*c*, therefore the surge chamber 232 pressure. Furthermore, the integration of the aerator 270 between the control valve 250 and converging nozzle 271*s* may provide a uniform low pressure operable to increase the flow velocity and reduce the required fluid diverted off the supply line 14, thereby increasing the efficiency of the system and reducing carbon emissions in the vapor recovery system and the fueling operation.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed:

1. A vapor recovery system for a mobile fueler during a fuel operation, comprising:

a. a vacuum jet pump comprising:

i. a vapor recovery inlet and a liquid fuel inlet, a surge cavity, a ullage pressure channel, a mixing channel, a housing collar, an upper central cylindrical conduit, an aerator, a converging jet orifice, and a lower cylindrical conduit, ii. a diaphragm assembly having a collar securing a control rod in the center of a diaphragm gasket and a spring, iii. an upper housing cap having an ullage pressure port and being operable to secure said diaphragm assembly against said housing body to provide a fluid-tight seal, the diaphragm gasket defining an upper diaphragm cavity and a lower diaphragm cavity, iv. a vapor channel connecting said surge chamber to said lower diaphragm cavity; and b. a mobile fueler having a storage tank in communication with a supply pump that is operable to deliver fuel through a supply line to a fuel dispensing assembly having a vapor recovery inlet.

2. The vapor recovery system of claim 1, wherein said surge chamber and lower diaphragm cavity have a substantially equivalent pressure, wherein said vacuum is operable to pull said diaphragm gasket down when a vacuum threshold is reached, thereby controlling the liquid fuel exiting said converging nozzle.

3. The vapor recovery system of claim 2, further comprising a u-cup gasket on a control valve, wherein the u-cup gasket is operable to provide a fluid-tight seal with the upper central cylindrical conduit surface, wherein said control valve is positioned in said upper central cylindrical conduit.

4. The vapor recovery system of claim 1, wherein said ullage pressure channel is in communication with a ullage space tank pressure of a storage tank and is operable to allow diaphragm compression.

5. The vapor recovery system of claim 1, the vacuum jet pump further comprising:

i. a control valve having a pilot valve, a flow gate, a central shaft conduit, and a spring seat securing a control spring, wherein said control valve is positioned in said upper central cylindrical conduit and said control spring interfaces with said housing collar;

ii. said aerator having a central shaft conduit having a central shaft and a converging nozzle conduit operable to be sealed by said control rod, wherein said aerator and converging nozzle secured in said lower cylindrical housing conduit; and iii. a lower housing cap having a vapor return line and an ullage pressure port, and is operable to secure a lower housing gasket to a housing of said vacuum jet pump and provide a fluid-tight seal.

6. The vapor recovery system of claim 1, further comprising a fuel diverter line in communication with said supply line and a housing liquid fuel inlet, and a vapor recover line connecting said vapor recovery inlet of said housing and fuel dispensing assembly, wherein said diaphragm assembly is normally open and during a fuel operation liquid fuel fills said upper central cylindrical conduit and provides a fluid pressure operable to overcome the control spring bias and allows liquid fuel to pass through said fuel gate to said aerator for developing a uniform flow to said converging nozzle and rapidly expanding in said mixing chamber thereby generating a vacuum on said surge chamber and depositing said fluid vapor mixture into said storage tank.

7. The vapor recovery system of claim 1, wherein said aerator includes a plurality of individual conduits that provide a uniform flow in the fluid before interacting with a spacer.

8. A vapor recovery system for a mobile fueler during a fuel operation, comprising:

a. a vacuum jet pump including i. a housing body, having a vapor recovery inlet and a liquid fuel inlet, a surge cavity, an ullage pressure channel, a mixing channel, a housing collar, an upper central cylindrical conduit, and a lower cylindrical conduit;

ii. a diaphragm assembly having a collar securing a control rod in the center of a diaphragm gasket and a spring;

iii. an upper housing cap having an ullage pressure port and being operable to secure said diaphragm assembly against said housing body to provide a fluid-tight seal, the diaphragm assembly gasket defining an upper diaphragm cavity and a lower diaphragm cavity; and iv. an aerator having a central shaft conduit having a central shaft and a converging nozzle conduit operable to be sealed by said control rod, wherein said aerator and converging nozzle are secured in said lower cylindrical housing conduit.

9. The vapor recovery system of claim 8, further comprising i. a control valve having a pilot valve, a flow gate, a central shaft conduit, and a spring seat securing a control spring, wherein said control valve is positioned in said upper central cylindrical conduit and said control spring interfaces with said housing collar; and ii.

iii. a lower housing cap having a vapor return line and an ullage pressure port, and is operable to secure a lower housing gasket to said housing body and provide a fluid-tight seal, wherein said diaphragm assembly is normally open and during a fuel operation liquid fuel fills said upper central cylindrical conduit and provides a fluid pressure operable to overcome the control spring bias and allows liquid fuel to pass through said fuel gate to said aerator for developing a uniform flow to said converging nozzle and rapidly expanding in said mixing chamber thereby generating a vacuum on said surge chamber and depositing said fluid vapor mixture into said storage tank.

10. The vapor recovery system of claim 8, further comprising a vapor channel connecting said surge chamber to said lower diaphragm cavity.

11. The vapor recovery system of claim 10, wherein said surge chamber and lower diaphragm cavity have a substantially equivalent pressure, wherein said vacuum is operable to pull said diaphragm gasket down when a vacuum threshold is reached, thereby controlling the liquid fuel exiting said converging nozzle.

12. The vapor recovery system of claim 8, further comprising a u-cup gasket on said control valve above said pilot valve, wherein the u-cup is operable to provide a fluid-tight seal with the upper central cylindrical conduit surface.

13. The vapor recovery system of claim 9, further comprising an O-ring gasket positioned below said flow gate, that is operable to provide a fluid-tight seal with said central cylindrical conduit.

14. The vapor recovery system of claim 8, wherein said ullage pressure channel is in communication with the ullage space tank pressure of a storage tank and is operable to allow diaphragm compression.

15. A vapor recovery system for a mobile fueler during a fuel operation, comprising:

a. a vacuum jet pump including
  i. a vapor recovery inlet and a liquid fuel inlet, a surge cavity, an ullage pressure channel, a mixing channel, a housing collar, an upper central cylindrical conduit, and a lower cylindrical conduit;
  ii. a diaphragm assembly having a collar securing a control rod in the center of a diaphragm gasket and a spring; and
  iii. an aerator having a central shaft conduit having a central shaft and a converging nozzle conduit operable to be sealed by said control rod, wherein said aerator and converging nozzle secured in said lower cylindrical housing conduit,
    wherein said aerator is operable to uniform a flow of liquid before interacting with the converging nozzle conduit.

16. The vapor recovery system of claim 15, further comprising a. an upper housing cap having an ullage pressure port and being operable to secure said diaphragm assembly against said housing body to provide a fluid-tight seal, the diaphragm assembly gasket defining an upper diaphragm cavity and a lower diaphragm cavity;
b. a control valve having a pilot valve, a flow gate, a central shaft conduit, and a spring seat securing a control spring, wherein said control valve is positioned in said upper central cylindrical conduit and said control spring interfaces with said housing collar; and
c. a lower housing cap having a vapor return line and an ullage pressure port, and is operable to secure a lower housing gasket to said housing body and provide a fluid-tight seal.

17. The vapor recovery system of claim 16, further comprising a mobile fueler having a storage tank in communication with a supply pump that is operable to deliver fuel through a supply line to a fuel dispensing assembly having a vapor recovery inlet.

18. The vapor recovery system of claim 17, further comprising a fuel diverter line in communication with said supply line and said housing liquid fuel inlet, and a vapor recover line connecting said vapor recovery inlet[s]] of said housing and fuel dispensing assembly.

19. The vapor recovery system of claim 18, wherein said diaphragm assembly is normally open and during a fuel operation liquid fuel fills said upper central cylindrical conduit and provides a fluid pressure operable to overcome the control spring bias and allows liquid fuel to pass through said fuel gate to said aerator for developing a uniform flow to said converging nozzle and rapidly expanding in said mixing chamber thereby generating a vacuum on said surge chamber and depositing said fluid vapor mixture into said storage tank.

* * * * *